United States Patent
Demtröder

(10) Patent No.: US 9,453,499 B2
(45) Date of Patent: Sep. 27, 2016

(54) WIND TURBINE GENERATOR WITH ADAPTIVE LOCKED SPEED OPERATION

(71) Applicant: VESTAS WIND SYSTEMS A/S, Aarhus N (DK)

(72) Inventor: Jens Demtröder, Rønde (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 159 days.

(21) Appl. No.: 14/362,426

(22) PCT Filed: Dec. 20, 2012

(86) PCT No.: PCT/DK2012/050494
§ 371 (c)(1),
(2) Date: Jun. 3, 2014

(87) PCT Pub. No.: WO2013/097863
PCT Pub. Date: Jul. 4, 2013

(65) Prior Publication Data
US 2014/0327243 A1 Nov. 6, 2014

(30) Foreign Application Priority Data

Dec. 30, 2011 (DK) ................................. 2011 70767

(51) Int. Cl.
*F03D 7/02* (2006.01)
*F03D 7/04* (2006.01)

(52) U.S. Cl.
CPC ........... *F03D 7/0296* (2013.01); *F03D 7/0276* (2013.01); *F03D 7/042* (2013.01);
(Continued)

(58) Field of Classification Search
CPC ........ F03D 9/002; F03D 9/005; F03D 9/003; F03D 1/02
USPC .................................................... 290/44, 55
See application file for complete search history.

(56) References Cited

U.S. PATENT DOCUMENTS

2003/0151260 A1*  8/2003  Siegfriedsen ................... 290/44
2007/0018457 A1*  1/2007  Llorente Gonzalez ......... 290/44
(Continued)

FOREIGN PATENT DOCUMENTS

EP  1944667 A1  7/2008
EP  2123906 A1  11/2009
(Continued)

OTHER PUBLICATIONS

International Search Report for PCT/DK2012/050494, Apr. 4, 2013.
(Continued)

*Primary Examiner* — Tulsidas C Patel
*Assistant Examiner* — Sean Gugger
(74) *Attorney, Agent, or Firm* — Patterson+Sheridan LLP

(57) ABSTRACT

An adaptive wind turbine generator (WTG) control system comprising a measurement system MS with sensors A1, A2, MC arranged to perform measurements of mechanical vibrations of one or more mechanical components of the WTG, at a plurality of operating conditions for the WTG. A storage unit SU stores, in a measurement database MD, measured data and corresponding operating condition OC data for the WTG. An operating condition manager OCM determines how to operate the WTG, including rotor speed PSC, according to a control algorithm in response to the data stored in the measurement database MD. Hereby, individual vibration measurements on critical components such as electric power generator and blades of the WTG can be taken into account in determining which rotor speed windows to avoid. This allow a more power efficient WTG, since a large safety margin around calculated or predetermined tabulated rotor speed windows can be avoided. Further, with a continuous update of the measurements, the control system can take into account variations in the vibration behavior of the components over time.

14 Claims, 3 Drawing Sheets

(52) U.S. Cl.
CPC ........ *F03D 17/00* (2016.05); *F05B 2270/333* (2013.01); *F05B 2270/334* (2013.01); *Y02E 10/722* (2013.01); *Y02E 10/723* (2013.01)

(56) References Cited

U.S. PATENT DOCUMENTS

2009/0110540 A1    4/2009  Bywaters
2009/0292397 A1*  11/2009  Bjerge et al. ................ 700/280
2010/0133818 A1    6/2010  Kinzie et al.
2010/0135798 A1*   6/2010  Eggleston ...................... 416/36

FOREIGN PATENT DOCUMENTS

EP    2213998 A2   8/2010
EP    2216549 A2   8/2010

OTHER PUBLICATIONS

Danish Serach Report for PA 2011 70767, Aug. 10, 2012.

* cited by examiner

WIND TURBINE GENERATOR WITH ADAPTIVE LOCKED SPEED OPERATION

FIELD OF THE INVENTION

The present invention relates to the field of wind turbine generators for generating electric power. More specifically, the invention provides a control system for a wind turbine generator.

BACKGROUND OF THE INVENTION

To increase the life time of a wind turbine generator (WTG), it is well known that vibration levels can be monitored, so as to control operation of the WTG to avoid operating the WTG at conditions where high vibration levels are seen on any of such as: electric generator, gear box, and blades. Such control of the WTG locks the rotor speed to a rotor speed value, navigating around critical rotor speed ranges.

In practice, a WTG can be supplied with a predetermined set of rotor speed ranges which the control system avoids at long periods of time and at high loads. However, manufacturing tolerances and other factors influence actual critical rotation speeds for an individual WTG, and furthermore ageing of some mechanical components can also influence the actual critical rotor speed ranges for the WTG. Therefore, taking into account such manufacturing tolerances and ageing factors, a predetermined set of rotor speed ranges to avoid tend to cover a large range of possible rotor speeds, if a reasonable safety margin is taken into account. This means that ensuring a safe operation of the WTG will lead to a poor power efficiency, since the control system will navigate around the most power effective rotor speed in a large part of the operating time.

SUMMARY OF THE INVENTION

Following the above description, it may be seen as an object of the present invention to provide a WTG control system capable of providing a high power efficiency from the WTG and still takes into account operating the WTG at conditions where critical mechanical components are operated at safe vibration levels.

In the context of the present invention, the term "wind turbine generator" (WTG) should be considered to include, but is not limited to, a WRG comprising one or more (rotor) blades which are rotatable, by action of the wind, around a horizontal axis mounted in a nacelle mounted on the uppermost part of an elongated tower. The nacelle itself is pivotal around a vertical axis in order to turn the rotor blade into a suitable aligned position with the wind direction. The one or more rotor blades is rotated at a rotor speed which is depending on the wind and the aerodynamics of the rotor blades in order to drive a generator for converting wind energy into electric energy. In short, a wind turbine or WTG or wind generator or aerogenerator may be defined as a means for converting the kinetic energy of the wind into mechanical energy and, subsequently, into electric energy.

In a first aspect, the invention provides an adaptive WTG control system comprising
a measurement system comprising at least one sensor arranged to perform a plurality of measurements of a physical parameter indicative of mechanical vibrations of at least one mechanical component of the WTG at a plurality of operating conditions for the WTG,
a storage unit arranged to store, in a measurement database, data related to the plurality of measurements together with corresponding operating condition data for the WTG, and
an operating condition manager arranged to determine at least a rotor speed of the WTG according to a control algorithm in response to the data stored in the measurement database.

Such WTG is advantageous, since critical mechanical components can be supplied with vibration sensors that, after a period of operation, allows logging of critical resonance frequencies for each critical mechanical component and the corresponding rotor speeds. Thus, the control system can adapt the operation of the WTG in response to actual measurements of vibration levels on the individual WTG installation. Hereby, safe operation is ensured in spite that only a minimal safety margin, or even no safety margin, is provided around rotor speeds where critical vibration levels are detected. Thus, e.g. based on vibration level thresholds for each critical component, it is possible to establish a set of rotor speed, ranges to avoid, and this set of rotor speed ranges will occupy a minimum of rotor speeds compared to prior art control systems, thus leaving room to selection the most power efficient rotor speed at a given wind condition. Hereby, a safe operation can be combined with a high power efficiency. Furthermore, since the WTG control system learns and adapts the operation according to update measurements continuously or at least update measurements at regular intervals, the WTG will be able to adapt to changes in resonances due to wear of the mechanical components and other parameters that may vary over time. Thus, the control of the operation of the WTG is responsive to the actual state of the mechanical components and other parameters that may influence resonances.

In some embodiment, the control system comprises a resonance detector. Such resonance detector may be arranged to determine a rotor speed range in which operation of the WTG should be restricted, in response to the plurality of measurements of a physical parameter indicative of mechanical vibrations of at least one mechanical component, and wherein the storage unit is arranged to store data indicative of the rotor speed range in which operation of the WTG should be restricted. Hereby, if measurements are updated at a regular basis, the control system will always be able to operate the WTG according to the most efficient scheme, taking into account rotor speed ranges to avoid at high loads. It is to be understood that the resonance detector can be implemented in various ways, based on the measured vibration levels or other data measured on the mechanical component(s).

In one embodiment, the resonance detector is arranged to determine a rotor speed range where operation of the WTG should be restricted to avoid triggering mechanical resonances, in response to a comparison between a measure of vibration level or noise level and a threshold value. Thus, based on a set of vibration level thresholds for various mechanical components, the resonance detector can determine the rotor speed ranges at which the mechanical component is in a resonance state, if any. Especially, the control, system may be arranged to vary such threshold value in response to time, so as to adapt an accepted vibration level of at least one mechanical component of the WTG in response to an age of the WTG. This allows a power efficient operation of the WTG when the WTG is still new, where a high vibration levels can be accepted. At an older stage, a lower threshold can be set up to ensure a more careful operation of the WTG, thus resulting in a lower power efficiency, but an expected longer life time of the WTG.

The operating condition manager may be arranged to calculate a desired relation between rotor speed and produced electric power in response to at least a wind condition, to modify the desired relation between rotor speed and produced electric power in response to the data related to the plurality of measurements, and to control operation of the WTG accordingly. Hereby, the control system can calculate the most power efficient operation, with the given wind conditions, and then modify this operation to comply with speed ranges that should be avoided due to mechanical resonances. In other words, the control system may include a control strategy for navigating around the speed ranges with resonances in the most power efficient way, taking into account acceptable loads to be applied, and also acceptable time when inevitably operating the WTG within the rotor speed ranges with restricted requirements.

The control system is preferably arranged to perform updated measurements of the physical parameter indicative of mechanical vibrations of the at least one mechanical component, so as to adapt to changes in mechanical components over time. Thus may be performed continuously so as to obtain data for many different operating conditions, or the measurements may be updated at regular intervals.

The at least one sensor of the measurement system may comprise an accelerometer, a strain gauge, an optical vibration sensor, and a microphone. Other types of sensors capable of providing data indicative of vibration levels or noise levels can be used as well. One or more sensor may be provided on each critical mechanical component. E.g. two or three vibration sensors may be provided to measure vibrations on one mechanical component in respective directions or at respective positions on the components.

In some embodiments, the at least one sensor comprises a microphone arranged to measure noise generated by at least one mechanical component, e.g. by a microphone placed in the nacelle. Especially, the operating condition manager may be arranged to estimate external noise generated by the WTG in response to noise measured by the microphone. Hereby, the control system may be arranged to take into account different external noise demands which the WTG must comply with, e.g. different noise limits at day and night, and also it may be possible to analyse the noise with respect to pure tones, so as to estimate if the external noise limit for the WTG will be further restricted by a so-called pure tone penalty. This allows the control system to operate the WTG so as to comply with the given noise limits.

The measurement system may comprise a plurality of sensors arranged to perform measurements of physical parameters indicative of mechanical vibrations of respective mechanical components of the WTG. Especially, it is preferred that at least one sensor is provided on each of: electric power generator, gear box, and at least one blade, e.g. all blades of the WTG. More specifically, vibration sensors may be arranged to measure relative flapwise vibrations between at least two blades, which is known to provide a possible resonance which may not be possible to detect by vibration measurements on the drive train or by separate vibration measurements on the blades.

In general, the measurement system is preferably arranged to perform spectral analysis of signals received from the at least one sensor. It is preferred to measure vibration levels and/or noise levels of the mechanical components, and for many of the components, a spectral analysis of the measured time signals may advantageously be performed so as to identify specific frequency components which can be used in classifying the state of the mechanical component. Further, the storage unit may be arranged to store data indicative of a spread in a vibration level or a noise level versus frequency, for at least one mechanical component. This spread may further be used to identify if a vibration resonance peak of a component is narrow, i.e. only is affected by a narrow rotor speed range, or if the resonance is wide, thus requiring avoidance of a wider range of rotor speeds.

In a second aspect, the invention provides a WTG comprising a WTG control system according to the first aspect.

In a third aspect, the invention provides a method for controlling a WTG, the method comprising
performing a plurality of measurements of a physical parameter indicative of mechanical vibrations of at least one mechanical component of the WTG at a plurality of operating conditions for the WTG,
storing data related to the plurality of measurements together with corresponding operating condition data for the WTG in a measurement database, and
determining at least a rotor speed of the WTG according to a control.

It is understood that the same advantages as described for the first aspect apply as well for the second and third aspects, and the same principal embodiments from the first aspect apply as well for the second and third aspects. The first, second, and third aspects may each be combined with any of the other aspects. These and other aspects of the invention will be apparent from and elucidated with reference to the embodiments described hereinafter.

BRIEF DESCRIPTION OF THE FIGURES

Embodiments of the invention will be described in more detail in the following with regard to the accompanying figures. The figures show one way of implementing the present invention and is not to be construed as being limiting to other possible embodiments falling within, the scope of the attached claim set.

DETAILED DESCRIPTION OF AN EMBODIMENT

Figure 1:
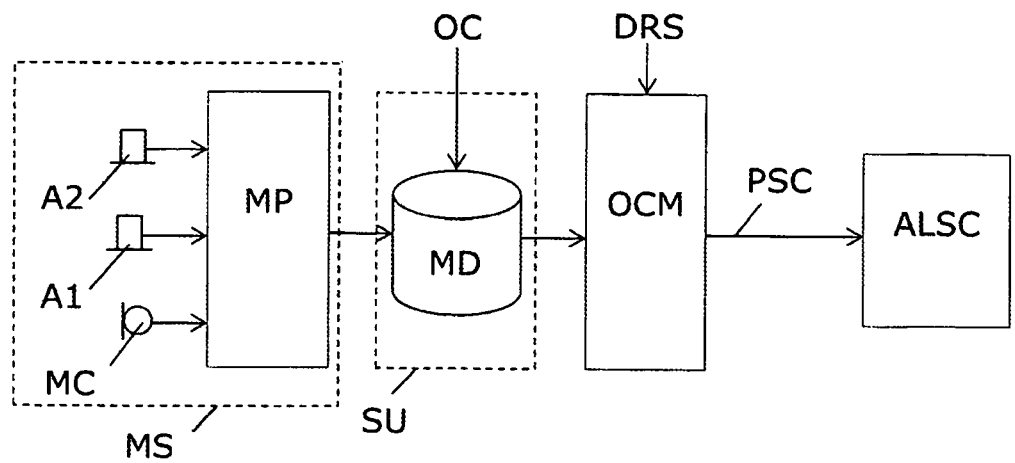
FIG. 1 illustrates a block diagram of a windturbine control system embodiment.

FIG. 1 shows a block diagram of an adaptive WTG control system embodiment. A measurement system includes a measurement processor MP which receives input from measurement sensors, here two accelerometers A1, A2 and from a microphone MC. These sensors A1, A2, MC are positioned on critical mechanical components of the WTG to provide data indicative of vibrations of such components, especially the drive train and the blades. E.g. A1 can be mounted on the electric power generator, A2 can be mounted on the rotor structure, and the microphone MC can be placed to measure acoustic noise in the nacelle. Thus, a plurality of measurements of vibration levels and noise levels can be stored together with information about the corresponding operating conditions OC for the WTG at the time when the measurements were performed. Especially, such operating conditions OC can include external conditions such as temperature, wind speed and direction, but also conditions concerning rotor speed of the WTG, and the actual generated electric power. Hereby, it is possible for the measurement system to be able to obtain measurement inputs from the sensors A1, A2, MC during a variety of different operating conditions.

A storage unit SU stores data related to the plurality of measurements, e.g. vibration levels and/or vibration spectra, together with the corresponding operating condition OC data for the WTG in a measurement database MD. Preferably, also a time stamp is stored, so as to allow monitoring of a temporal evolving in the vibration levels.

An operating condition manager OCM is arranged to determine a set of parameters PSC comprising at least a rotor speed of the WTG according to a control algorithm in response to the data stored in the measurement database MD. However, in the illustrated embodiment, the operating condition manager OCM executes an algorithm that responds to a desired rotor speed DRS received from an algorithm that calculates the rotor speed to be applied for the most efficient power generation from the WTG, based on the current or estimated wind conditions. The operating condition manager OCM searches in the measurement database MD for vibration data at or near the desired rotor speed DRS, and in case one or more of the mechanical components exhibit high vibration levels at the desired rotor speed DRS and the desired electric power level, the operating condition manager OCM calculates a strategy for navigating around a range of rotor speeds with unacceptable vibration levels in the most power efficient way. A set of parameters PSC, e.g. in the form of a power-speed curve to follow, is then generated accordingly and applied to adapted locked speed controller ALSC which controls the WTG accordingly, such as know in the art.

The advantage of the invention is that the normal set of predetermined rotor speed ranges to be avoided, is replaced by a dynamic measurement database MD which is updated with measured data for the actual mechanical components of the individual WTG at different operating conditions. Thus, the operating condition manager only needs to navigate around the most critical operating conditions, e.g. combinations of rotor speed and power load, where it has actually been registered that high vibration levels occur. This allows a more power efficient operation of the WTG, since it is only necessary to navigate around the actually critical rotor speed ranges without taking into account a safety margin due to individual variations due to component tolerances and possible temporal variations in the behaviour of the components.

In practice, the invention can be implemented by including a start-up set of pre-programmed rotor speed ranges to be navigated around, i.e. as in prior art WTGs. Once the WTG is in operation, the measurement database MD will be updated with measurements at different operating conditions, and the control system will adaptively learn the actual performance of the individual WTG, and thus be able to override the start-up rotor speed range where restricted operation is required.

Figure 2:
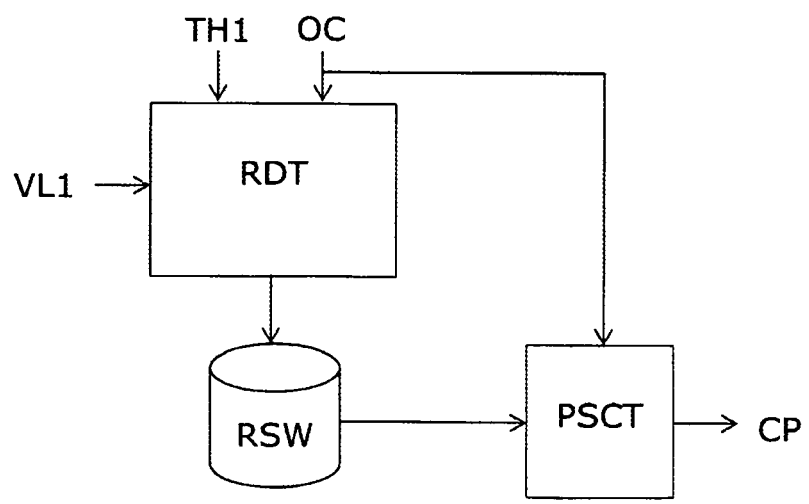
FIG. 2 illustrates a block diagram of an example of determining and storing information about resonance states.

FIG. 2 shows a block diagram of one way to implement a resonance detector RDT in response to an input in the form of a vibration level VL1 for a mechanical component. In one embodiment, the measured vibration level VL1 is compared to a predetermined threshold TH1 for the mechanical component, e.g. in the form of a vibration threshold for safety operation of the mechanical component. If the vibration level VL1 exceeds the threshold TH1, the measurement can be classified as a "resonance". At the same time, operating condition data OC for the WTG, at least including a rotor speed, is also logged, and in response the resonance detector saves in a database or in a memory, a rotor speed window RSW where the vibration level VL1 for the mechanical component exceeds the threshold TH1. Thus, this rotor speed window serves RSW as input to a power-speed controller PSCT that generates corresponding control parameters CP to control the WTG.

The rotor speed window RSW data is preferably updated when new measurements indicate any changes. E.g. the database or memory can be in the form of a fixed set of rotor speed windows RSW where only the upper and lower rotor speeds are adaptively updated in response to new measurements.

Figure 3:
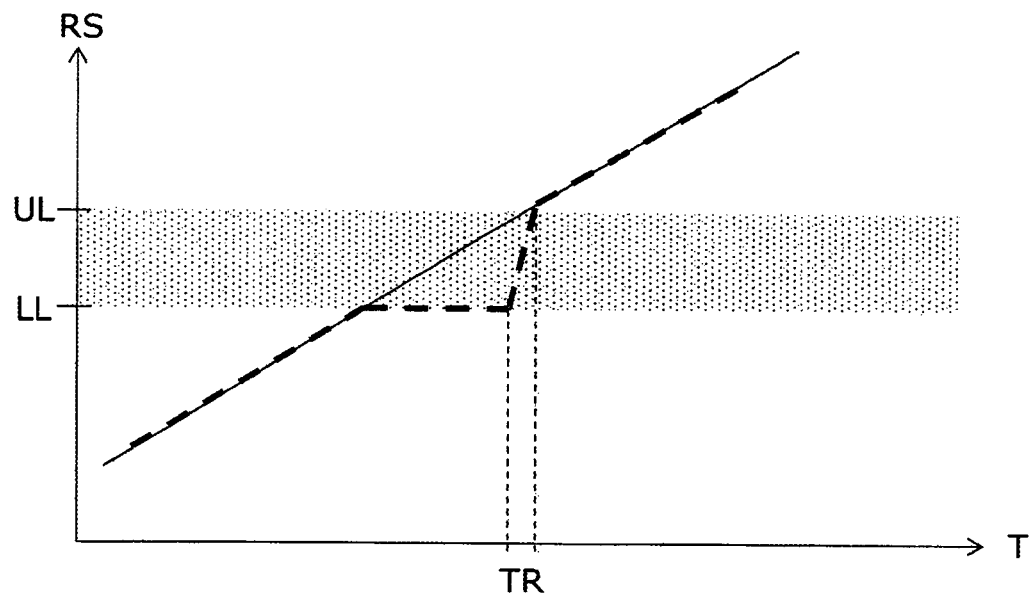
FIGS. 3 and 4 illustrate graphs of examples of navigating around a rotor speed range with a detected resonance of a mechanical component of the WTG.

FIG. 3 shows a graph illustrating a possible strategy for the control system for navigating around a rotor speed range or rotor speed window where critically high vibration levels and/or noise levels have been observed. The graph shows rotor speed RS versus time T, and the critical rotor speed window between a lower limit LL and an upper limit UL is indicated with dotted area. The solid line indicates the preferred rotor speed RS versus time T sequence with respect to optimum power efficiency. However, starting from a low rotor speed, this would include operating the WTG within the critical rotor speed window, i.e. between LL and UL for a rather long period of time. Instead, the control system may be programmed to follow the bold dashed line, where the preferred sequence is followed until the lower rotor speed limit LL is reached, and this rotor speed is then maintained for approximately the period as the optimal sequence prescribes to increase speed from the lower limit LL to the upper limit UL. Only slightly before the end of this period, the rotor speed is rapidly increased to the upper limit UL, thus operating the WTG within the LL to UL range only in a short period of time TR. After this navigating around, the optimal sequence can again be followed.

Figure 4:
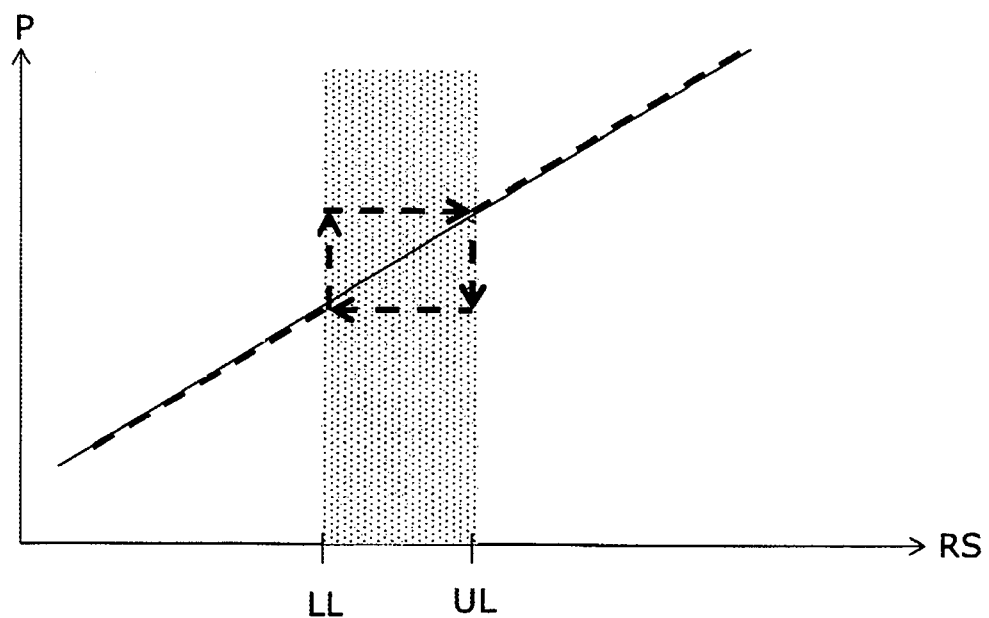

FIG. 4 shows another graph which also serves to illustrate how the control system can navigate around a critical rotor speed RS window within a lower limit LL and an upper limit UL. The graph illustrates the relation between generated electric power P versus rotor speed RS, also known as a power-speed curve. Again the dotted area indicates the critical rotor speed RS window, while the optimal sequence is indicated by the solid line, and the actually chose sequence is shown with the bold dashed lines and arrows. Starting from a low rotor speed, the optimal sequence if followed until the lower rotor speed limit LL is reached. The load is then increased until with a maintained rotor speed RS until the electric power P has been increased to a level which the optimal sequence prescribes corresponding to the upper rotor speed limit UL. Then the rotor speed is increased with a maintained power level P, until the upper rotor speed limit UL has been reached, and thereafter the optimal sequence can be followed. As indicated by the arrows, the opposite strategy is preferably followed when starting from a high rotor speed and slowing down the rotor, thus forming a curve of hysteresis.

Figure 5:
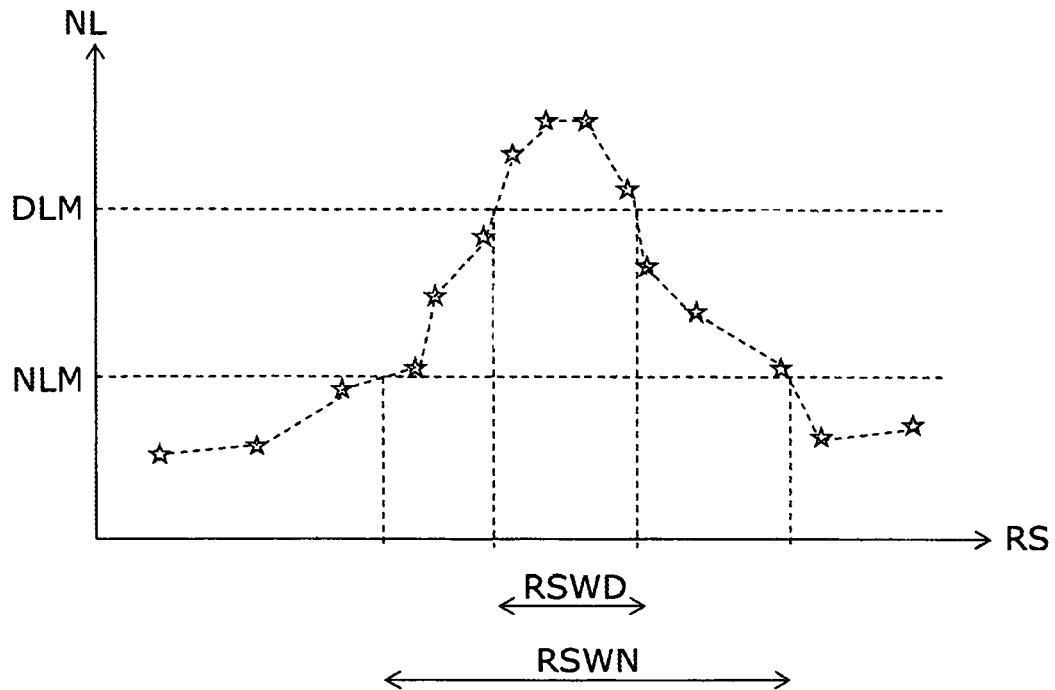
FIG. 5 illustrates a graph with examples of measured noise levels at different rotor speeds, and selection of different rotor speed ranges to avoid in day and night periods, where legislation sets up different external noise limits.

FIG. 5 shows a graph of example of measured noise levels NL, e.g. measured with a microphone placed in the nacelle. Such noise level NL may be used to estimate external noise emission from the WTG. The measurements are shown as asterisks and plotted versus rotor speed RS. As seen, the measurements indicate a resonance character of the noise level NL, since a peak in noise level NL is seen in a rather narrow rotor speed RS range. With knowledge of both the peak level and also the spread around the rotor speed RS where the peak level occurs, such data can be used to determine different rotor speed RS windows to avoid at periods where different external noise limits should be complied with. E.g. a day time noise limit DLM is indicated to be higher than a night time noise limit NLM. Taking the noise measurements into consideration, corresponding rotor speed windows RSWD and RSWN can be determined, which should be avoided to comply with the noise limits, since rotor speeds within the windows RSWD and RSWN would result in a noise level NL exceeding the limits DLM, NLM. For simplicity, the influence of the load level is not considered here, but in practice, it is possible to consider a multi-dimensional dependency when determining the rotor speed windows RSWD, RSWN.

Figure 6:
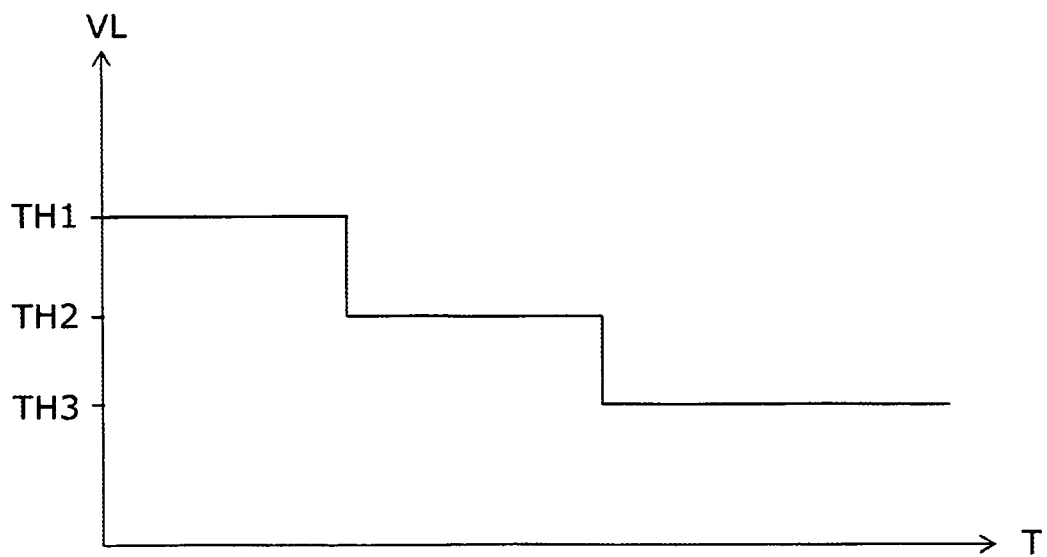
FIG. 6 illustrates a graph of an example of an allowed vibration threshold for a mechanical component versus time, showing that this threshold may be selected to vary during the life time of the WTG.

FIG. 6 illustrates a graph with vibration level VL versus time T and indication of an example of vibration level thresholds TH1, TH2, TH3 which is determined to change over time T for one or more critical mechanical component. Referring e.g. to FIG. 2, such vibration level threshold TH1 can be used in determining the critical rotor speed window to avoid for safe operation of the WTG. However, as illustrated in FIG. 6, it may be preferred that a rather high vibration level threshold TH1 is accepted for operating the WTG when it is new, while the threshold can be adjusted downwards to lower thresholds TH2, TH3 when the WTG gets older. Such strategy will increase the power efficiency when the WTG is new, whereas power efficiency is traded for long life time at a later state. Still, independent of the vibration threshold which is selected, the control system according to the invention will help to provide the highest possible power efficiency combined with an optimal safety, within the selected vibration threshold, since the evaluation against the threshold is an actual vibration measurement.

To sum up, the invention provide an adaptive WTG control system comprising a measurement system MS with sensors A1, A2, MC arranged to perform measurements of mechanical vibrations of one or more mechanical components of the WTG, at a plurality of operating conditions for the WTG. A storage unit SU stores, in a measurement database MD, measured data and corresponding operating condition OC data for the WTG. An operating condition manager OCM determines how to operate the WTG, including rotor speed PSC, according to a control algorithm in response to the data stored in the measurement database MD. Hereby, individual vibration measurements on critical components such as electric power generator and blades of the WTG can be taken into account in determining which rotor speed windows to avoid. This allow a more power efficient WTG, since a large safety margin around calculated or predetermined tabulated rotor speed windows can be avoided. Further, with a continuous update of the measurements, the control system can take into account variations in the vibration behaviour of the components over time.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

What is claimed is:

1. An adaptive wind turbine generator control system comprising:
    a measurement system comprising at least one sensor configured to perform a plurality of measurements of a physical parameter indicative of mechanical vibrations of at least one mechanical component of the wind turbine generator at a plurality of operating conditions for the wind turbine generator,
    a storage unit configured to store, in a measurement database, data related to the plurality of measurements together with data of the plurality of operating conditions for the wind turbine generator, and
    an operating condition manager configured to determine at least a rotor speed of the wind turbine generator according to a control algorithm in response to the data related to the plurality of measurements and the data of the plurality of operating conditions stored in the measurement database by:
        calculating a desired relation between rotor speed versus produced electric power in response to at least a wind condition, wherein the desired relation indicates an optimal rotor speed with respect to a given produced electric power;
        modifying the desired relation between rotor speed versus produced electric power to avoid a rotor speed range in which operation of the wind turbine generator should be restricted; and
        determining at least the rotor speed of the wind turbine generator according to the modified desired relation;
    wherein modifying the desired relation between rotor speed versus produced electric power comprises:
        increasing a rotor speed following the desired relation until a lower rotor speed limit is reached;
        increasing a produced electric power while maintaining the rotor speed at the lower rotor speed limit until the produced electric power is increased to a level corresponding to an upper rotor speed limit according to the desired relation;
        increasing the rotor speed while maintaining the produced electric power at the level corresponding to the upper rotor speed limit according to the desired relation, until the upper rotor speed limit is reached; and
        increasing the rotor speed beyond the upper rotor speed limit according to the desired relation.

2. The adaptive wind turbine generator control system according to claim 1, comprising a resonance detector configured to determine the rotor speed range in which operation of the wind turbine generator should be restricted, in response to the plurality of measurements of the physical parameter indicative of mechanical vibrations of the at least one mechanical component, and wherein the storage unit is configured to store data indicative of the rotor speed range in which operation of the wind turbine generator should be restricted.

3. The adaptive wind turbine generator control system according to claim 2, wherein the resonance detector is configured to determine the rotor speed range where operation of the wind turbine generator should be restricted to avoid triggering mechanical resonances, in response to a comparison between a measure of vibration level or noise level and a threshold value.

4. The adaptive wind turbine generator control system according to claim 3, configured to vary the threshold value in response to time, so as to adapt an accepted vibration level of the at least one mechanical component of the wind turbine generator in response to an age of the wind turbine generator.

5. The adaptive wind turbine generator control system according to claim 1, configured to perform updated measurements of the physical parameter indicative of mechanical vibrations of the at least one mechanical component, so as to adapt to changes in mechanical components over time.

6. The adaptive wind turbine generator control system according to claim 1, wherein the at least one sensor comprises at least one of: an accelerometer, a strain gauge, an optical vibration sensor, and a microphone.

7. The adaptive wind turbine generator control system according to claim 1, wherein the at least one sensor comprises a microphone configured to measure noise generated by the at least one mechanical component, and wherein the operating condition manager is configured to estimate external noise generated by the wind turbine generator in response to noise measured by the microphone.

8. The adaptive wind turbine generator control system according to claim 1, wherein the measurement system comprises a plurality of sensors configured to perform measurements of physical parameters indicative of mechanical vibrations of respective mechanical components of the wind turbine generator.

9. The adaptive wind turbine generator control system according to claim 8, wherein the mechanical components comprises one or more of: an electric power generator, a gear box, and at least one blade.

10. The adaptive wind turbine generator control system according to claim 9, comprising vibration sensors configured to measure relative flapwise vibrations between at least two blades.

11. The adaptive wind turbine generator control system according to claim 1, wherein the measurement system is configured to perform spectral analysis of signals received from the at least one sensor.

12. The adaptive wind turbine control generator control system according to claim 11, wherein the storage unit is configured to store data indicative of a spread in a vibration level or a noise level versus frequency, for at least one mechanical component.

13. A wind turbine generator comprising the adaptive wind turbine generator control system according to claim 1.

14. Method for controlling a wind turbine generator, the method comprising:
performing, using at least one sensor, a plurality of measurements of a physical parameter indicative of mechanical vibrations of at least one mechanical component of the wind turbine generator at a plurality of operating conditions for the wind turbine generator,
storing data related to the plurality of measurements together with data of the plurality of operating conditions for the wind turbine generator in a measurement database, and
determining at least a rotor speed of the wind turbine generator according to a control algorithm in response to the data related to the plurality of measurements and the data of the plurality of operating conditions stored in the measurement database by:
calculating a desired relation between rotor speed versus produced electric power in response to at least a wind condition, wherein the desired relation indicates an optimal rotor speed with respect to a given produced electric power;
modifying the desired relation between rotor speed versus produced electric power to avoid a rotor speed range in which operation of the wind turbine generator should be restricted; and
determining at least the rotor speed of the wind turbine generator according to the modified desired relation;
wherein modifying the desired relation between rotor speed versus produced electric power comprises:
increasing a rotor speed following the desired relation until a lower rotor speed limit is reached;
increasing a produced electric power while maintaining the rotor speed at the lower rotor speed limit until the produced electric power is increased to a level corresponding to an upper rotor speed limit according to the desired relation;
increasing the rotor speed while maintaining the produced electric power at the level corresponding to the upper rotor speed limit according to the desired relation, until the upper rotor speed limit is reached; and
increasing the rotor speed beyond the upper rotor speed limit according to the desired relation.

* * * * *